Dec. 26, 1950 W. H. STIGTER 2,535,522
SHELL-SHAPED HEATER WITH REGENERATOR
FOR HOT-GAS ENGINES
Filed Sept. 10, 1945

INVENTOR.
Willem Hendrick Stigter
BY
AGENT.

Patented Dec. 26, 1950

2,535,522

UNITED STATES PATENT OFFICE 2,535,522

SHELL-SHAPED HEATER WITH REGEN-
ERATOR FOR HOT-GAS ENGINES

Willem Hendrik Stigter, Eindhoven, Netherlands,
assignor to Hartford National Bank & Trust
Co., Hartford, Conn., as trustee Application September 10, 1945, Serial No. 615,495
In the Netherlands July 1, 1944

Section 1, Public Law 690, August 8, 1946
Patent expires July 1, 1964

11 Claims. (Cl. 60—24)

This invention relates to hot-gas engines and more specifically to an improvement in the organization of the various parts associated with the hot chamber to provide a minimum dead air space in the working cylinder for maximum efficiency of these engines and also to obtain easy access to the hot chamber when such novel combination of parts are used therewith.

This invention, therefore, concerns a hot-gas engine which is to be understood to mean a thermodynamic power engine, in which a thermodynamic cycle is traversed by a quantity of gas enclosed in a chamber having a variable volume, and which chamber contains or freely communicates with a heating part, a regenerator, and in addition contains a cooling part. The cooling part moreover, is contained or communicates with another chamber having a variable volume. The chamber adjoining the heating part is called the hot chamber, the chamber adjoining the cooling part being called the cold chamber.

A part of the quantity of gas, enclosed in the said chambers may, if required, be admitted into one or more individual closed tubes or vessels and subsequently be admitted again from one or more of these tubes or vessels into the said chambers. In all these cases the thermo-dynamic cycle is called a closed cycle.

If desired, the cooling part of the engine may be omitted and replaced by a periodical communication with the open air, in which case a new quantity of air is aspirated for every cycle. Such motors are called engines with open cycle. Both in engines with open cycle and in engines with closed cycle such a phase difference exists between the volume variations of the hot chamber and the cold chamber that the gas is successively subjected to heating, expansion, cooling and compression.

Hot-gas engines comprising shell-shaped heating bodies which surround the hot space of this engine, have already been proposed. Each of these heating bodies is furnished with bore holes through which flows the medium feeding the heat. These bores are provided either from one of the end surfaces of the cylindrical body to the outer surface of this body or from a point of this outer surface to another point of this surface. In all these cases the manufacture of such a perforated heating body is much simpler if the outer surface of this cylindrical body is freely accessible for tools. However, a wall surrounding the heater is necessary for reasons of construction, since the gas current must be collected through the said bores in a chamber on the exterior of the heater.

Although hot-gas engines have been proposed heretofore with shell-shaped heating bodies such as cylinders surrounding the so-called hot space or chamber and these bodies contained a plurality of paths for conveying the heat flow medium to desired areas within and on these bodies, yet the efficiency of these engines was not materially improved and they had the added disadvantages that certain interior parts were not easily accessible for their usual servicing and inspection. Moreover rapid production of the pertinent engine parts is not obtainable.

Therefore the primary object of this invention is to provide means in a hot-gas engine to overcome at least the above problems.

Another object of this invention is to provide a hot-gas engine with negligible heat loss through the dead air space in the engine cylinder.

A further object of this invention is to provide an arrangement of parts associated with the hot chamber in a hot gas engine whereby easy access to the interior of said chamber is obtained.

A still further important object of this invention is to provide a combination of means in a hot-gas engine amenable to rapid and cheap manufacture.

According to the present invention the aforesaid difficulty is solved by making use of a separate shell which surrounds the heating body and serves to fasten this heating body to the outer constructional part. After finishing the heater i. e. after providing the bores this separate shell may surround the heating body.

The connection between the heating body and this shell may be established in various ways which are known per se. Since this connection point is usually located in the immediate vicinity of the parts heated to a high temperature during operation of the engine a welded joint will frequently be preferred. To such end the heating body may be furnished with a flange to which the shell is welded.

When use is preferably made of a joint between the heater and the shell for easy removal of the same after mounting on the engine, e. g., for cleaning the heater, the connection is established by means of bolts, the heating body being provided with a bush-shaped projecting part which extends coaxially of this heating body in line therewith and is fastened at its end to the shell surrounding the heating body. By this bush-shaped extension the joint, which is established by means of bolts, is not located in the immediate vicinity of the parts which are heated during operation of the engine.

The invention will be more fully explained by giving two examples which are illustrated in the accompanying drawing.

Figure 1:
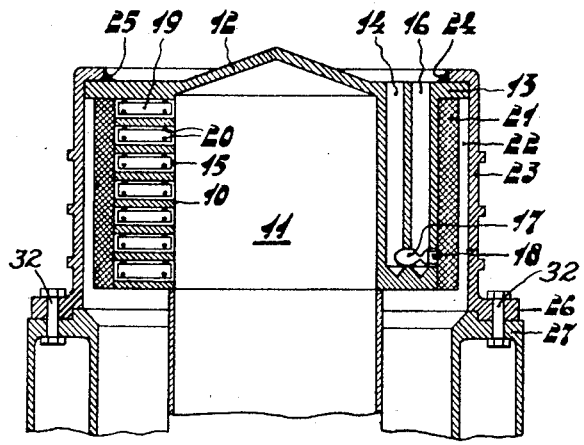
Figure 1 is a vertical sectional view of the hot chamber end of a hot-gas engine as one embodiment for the inventive concept.

In Fig. 1 the reference number 11 designates the hot chamber of a hot-gas engine which is surrounded by a heating-body 10. In this heating body bores are provided in various directions, which constitute ducts, one set of which such as bores 14, 16 serve to convey the medium feeding the heat and the other set such as 15 for the transport of the gas in the engine. In the represented form of construction the medium feeding the heat flows through the two bores 14 and 16 which extend parallel with the axis of the heating body from one of the end surfaces of this body. The depth of the bores is smaller than the length of the heating body in an axial direction, so that the bores 14 and 16 constitute blind ducts in themselves. Near the closed end of these bores is provided, however, a transverse bore 17 which extends from the outer wall of the heater and interconnects the two first-mentioned bores 14 and 16. The aperture formed by this bore 17 in the outer wall of the heating body 10 is closed by means of a stopper 18. The medium feeding the heat enters through the bore 14 and passes to the outside again through the bore 16 whilst giving off heat to the material of the heater.

In the cylindrical heating body 10 a system of radial bores 15 is provided between the system of axial bores 16—14. Bores 15 extend from the inner wall to the outer wall of the heating body. These bores contain cores 19 of metal or ceramic material which by means of cams 20 or protrusions distributed evenly over the periphery thereof leave an annular space between the inner wall of the bore 15 and the outer wall of core 19. The spaces thus formed in the bores 15 serve as a duct for the gaseous medium to be heated in the engine. This gas current flows from the hot chamber 11 through the bores 15 to the chamber 22 which surrounds the heater and is shut in by the outer wall 23 of the engine. Moreover, a regenerator 21 coaxially surrounds the heater in the aforesaid chamber 22.

The aforesaid bores 14 and 16 may be easily drilled from the end surface of the heating body. However, the bores 15 and 17 extend radially so that they must be drilled or otherwise produced either from the inner side or from the outer side of the heating body. Although it is not impossible to provide these bore-holes by means of special drill heads from the inner side, drilling by means of the usual straight boring bars is simpler and more accurate. To such end, however, the outer wall of the engine cannot be made in one piece with the heater 10. For this reason an outer wall 23 is constituted as a separate shell which forms a separate constructional part with respect to the heating body 10 and serves as a link between the heating body 10 and the other constructional parts such as a cooler 27 of the engine. The heating body 10 has an upper flange 13 to which is secured a flange 24 of the outer engine shell 23. Since this joint is located in the immediate proximity of the strongly heated material of the heater, joints by means of bolts and packing are not desirable at this point. This is the reason the flanges 13 and 24 are secured together by a welding seam 25. This circular welding seam 25 can be provided in a simple and easy manner.

Furthermore the heating body 10 comprises a curved cover 12 shutting off the hot chamber 11. This cover may either be made in one piece with the heating member or be secured thereto with a round welding seam. The shell 23, which is connected to the heater at one end, exhibits at its other end a flange 26 which is secured in the usual manner by means of bolts 32 and packing (not shown) to the cooler 27 of the engine.

Figure 2:
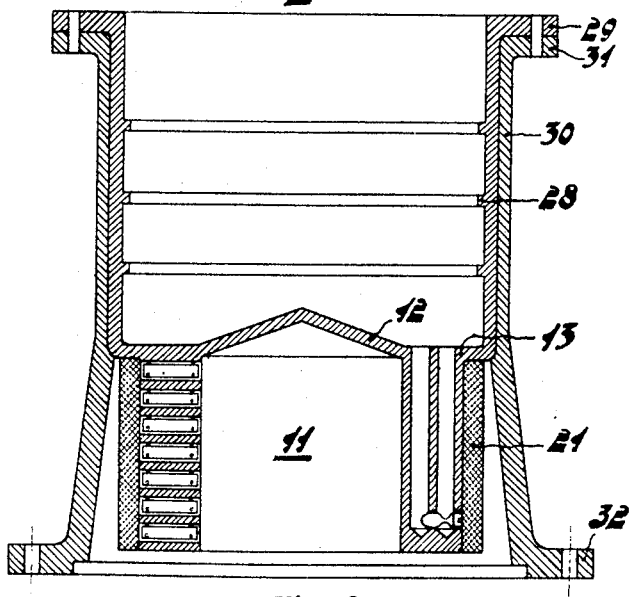
Figure 2 is a vertical sectional view of another embodiment of the hot-gas chamber end of a hot-gas engine permitting easy access to the hot chamber and allied parts.

The aforesaid form of construction has the drawback that after fastening the shell 23 to the heater 10 the radial ducts 15 in this heater are no longer accessible from the outside. The regenerator 21 may be exchanged by moving it coaxially of the heater 10 through the aperture 22 formed between the heater and the shell 23, it is true, but the said aperture is mostly too small to reach the bores 15 by means of tools. In the form of construction shown in Fig. 2 these drawbacks are met, since an outwardly protruding shell 30 is fastened by means of a bolt-joint to the heating body 10. It is desirable, however, that this connection should be located beyond through the area of the high operating temperature of the engine, and to this end the heating body 10 is furnished with a bush-shaped projection or inwardly ribbed cup-shaped extension 28 which extends coaxially thereof and in line with this heating body. This projection has a flange 29 which by means of conventional bolts (not shown) is fastened to a flange 31 of the shell 30. By means of another flange 32 it is connected similarly, as in the form of construction shown in Fig. 1, to the cooler 27. The loosening of the bolts in the flanges 29 and 31 permits the shell 30 to be removed from the circumference of the heating body 10 so that the bores 15 are accessible from without.

Certain other advantages accrue to the concept of organizing the parts of a hot-gas engine at the hot chamber end of the same in the manner disclosed, the most important of which is the approach to a zero dead air space in the hot chamber for a zero displacement of the well known hot-gas piston displacer. Other things being equally propitious in the subject structure the above condition makes it possible to approach a theoretically 100% efficient engine. At any rate, maximum efficiency is derived in a great measure from the minimizing of the dead air space, and the particular coordination of the regenerator 21 with the heating ducts 15 provides a minimum heat loss within the engine itself.

While the forms of embodiments of the present invention as herein disclosed constitute preferred forms, it is to be understood that other forms might be adopted, all coming within the scope of the claims which follow.

What I claim is:

1. In a hot-gas engine the combination comprising a cylindrically-shaped heating body having top and bottom portions, said heating body having substantially radially directed ducts in the walls thereof, said heating body surrounding a hot chamber, an outturned flange integral with said top portion of said heating body, a cylindrically-shaped cooler body positioned below said heating body, a cylindrically-shaped shell construction having top and bottom portions and surrounding said heating body and spaced concentrically therewith and outwardly therefrom to form a regenerator space therebetween, a flange extending from said top portion of said shell construction and another flange extending from said bottom portion thereof, means for fastening said outturned flange with said shell top portion flange and other means for fastening said shell bottom portion flange to said cooler body.

2. In a hot-gas engine the combination comprising a shell-shaped body having top and bottom portions and forming a hot chamber, a second shell construction having top and bottom portions and spaced from and surrounding said shell-shaped body, means coupling said shell construction and said body, said means comprising abutting flanges extending from each of said top portions of said shell construction and said body, an engine body positioned below said first shell-shaped body, and other means coupling said engine body to said shell construction, said other means comprising a flange extending from said bottom portion of said shell construction, whereby a hot gas zone around the outside of said chamber is formed.

3. In a hot-gas engine the combination comprising an elongated hot-chamber-forming body with transverse ducts therein and having top and bottom portions, a shell likewise having top and bottom portions and being spaced from and surrounding said body, means joining said shell to said body at the top portions thereof, and an engine body positioned below said elongated body and connected to said shell at the bottom portion thereof.

4. In a hot-gas engine the combination comprising a first hollow body having top and bottom portions and including a main body portion having substantially heavy parallel walls, a second larger hollow body likewise having top and bottom portions and joined to said first body at the top portions thereof, a third hollow body positioned below said first body and means coupling said third body to the bottom portion of said second body, whereby a hot gas zone is formed around said first body.

5. In a hot-gas engine the subcombination comprising a shell-shaped heating body surrounding a hot chamber, a plurality of hot gas ducts directed from said heating body, and a regenerator surrounding said ducts.

6. In a hot-gas engine the subcombination comprising a hot chamber including an exterior dome and comparatively thick inwardly disposed parallel walls therefrom, a set of heat paths longitudinally arranged within said walls, and another set of heat paths substantially transverse of said walls from said chamber.

7. In a hot-gas engine the subcombination comprising a hot chamber including an exteriorly protruding section and heavy walls with smooth interior surfaces longitudinally directed therefrom, a set of heat paths in part of said walls, and another set of heat paths in part of said walls, the planar direction of the first set of heat paths being at right angles to the planar direction of the second set of heat paths and a regenerator surrounding the outside of said walls and substantially covering an end of each of one of said sets of heat paths.

8. In a hot-gas engine the combination comprising a substantially cylindrically shaped hot chamber body having top and bottom portions and including an irregularly shaped cover, a curved regenerator detachably coupled exteriorly to said chamber body, a shell-shaped body likewise having top and bottom portions and surrounding and spaced from said hot chamber body, means joining said chamber body to said shell at the top portions thereof to enclose said regenerator on three sides thereof, an engine body below said chamber body, and means joining said shell at the bottom portion thereof to said engine body.

9. In a hot-gas engine the subcombination comprising a substantially cylindrically shaped, hot chamber wall body, heating ducts disposed in said wall body and extending radially thereof, and regenerator means adjacent the outer ends of said ducts.

10. In a hot-gas engine the combination comprising a hollow shaped heating body including a substantially thick walled cylindrical main body portion with spaced substantially radially directed ducts within said wall and with longitudinal heat paths within said wall, a cylindrically shaped regenerator surrounding said main body, an exterior shoulder at the top of said hollow body, a shell body including a cylindrical main body portion surrounding said regenerator and terminating in an inwardly turned shoulder on the upper end thereof, and an outwardly turned shoulder on the other lower end, an engine body positioned below said hollow-shaped body, said shell body being connected to said engine body at said outwardly turned shoulder and to said heating body at said upper shoulder, whereby a void heat path is formed around said regenerator and easy servicing of said ducts and allied parts is obtainable.

11. In a hot-gas engine the combination comprising a hollow-shaped heating body including a substantially thick walled cylindrical main body portion with spaced substantially radially directed ducts within said wall and also longitudinal heat paths within said wall, a comparatively thin walled cylindrical body portion attached to and extending from one end of said main body portion, a cylindrically-shaped regenerator surrounding said substantially thick walled main body portion, an exterior shoulder extending from the end of said thin walled body portion which is remote from said main body portion, a shell body including another cylindrical main body portion surrounding said regenerator and having a cylindrical extension thereof extending substantially parallel to and adjacent with said thin walled body portion and having an exterior shoulder extending therefrom which is in abutting relationship with said exterior shoulder on said thin walled portion, and an outwardly turned shoulder on the other end of said shell body which is remote from the end on which said outturned flange is positioned, said last-named flange being adapted for connection with an engine body.

WILLEM HENDRIK STIGTER.

REFERENCES CITED

The following references are of record in the file of this patent:

UNITED STATES PATENTS

| Number | Name | Date |
|---|---|---|
| 324,061 | Woodbury et al. | Aug. 11, 1885 |
| 393,663 | Rider | Nov. 27, 1888 |
| 601,031 | Anderson et al. | Mar. 22, 1898 |
| 1,534,794 | Lundgaard | Apr. 21, 1925 |
| 1,675,829 | Smith | July 3, 1928 |